United States Patent [19]

Landt et al.

[11] Patent Number: 4,999,636
[45] Date of Patent: Mar. 12, 1991

[54] RANGE LIMITING SYSTEM

[75] Inventors: Jeremy A. Landt, Los Alamos; Alfred R. Koelle, Santa Fe; David A. Eckhardt, Albuquerque, all of N. Mex.

[73] Assignee: Amtech Technology Corporation, Santa Fe, N. Mex.

[21] Appl. No.: 312,617

[22] Filed: Feb. 17, 1989

[51] Int. Cl.⁵ .............................................. G01S 13/32
[52] U.S. Cl. ...................................... 342/90; 342/145
[58] Field of Search ............................ 342/90, 145, 189

[56] References Cited
U.S. PATENT DOCUMENTS

| | | |
|---|---|---|
| 3,412,334 | 11/1968 | Whitaker . |
| 3,518,415 | 6/1970 | Gutleber . |
| 4,209,785 | 6/1980 | White . |
| 4,328,495 | 5/1982 | Thue . |
| 4,472,717 | 9/1984 | Eaves et al. . |
| 4,604,622 | 8/1986 | Delon et al. . |

Primary Examiner—Thomas H. Tarcza
Assistant Examiner—Mark Hellner
Attorney, Agent, or Firm—Blakely, Sokoloff, Taylor & Zafman, Roger S. Borovoy

[57] ABSTRACT

Briefly, the range limiting system of the invention is capable of differentiating desired received signals having an amplitude above a predetermined threshold level and at least one other recognizable predetermined characteristic, from other received signals below that predetermined threshold amplitude. The system has a means for combining the received signal, which is of unknown amplitude which may be above or below the predetermined threshold amplitude, with a known signal of the predetermined threshold amplitude having at least one other predetermined characteristic which is distinguishable from the other recognizable characteristic of the received signal. The output of the combining means passes to a signal processing means which produces an output signal whose other recognizable characteristic is determined by the received signal only when the received signal is above the predetermined threshold amplitude, and by the known signal when the received signal is below the predetermined threshold amplitude. The presence or absence of the desired signal is determined on the basis of analysis of the other predetermined characteristic of the output signal of the signal processing means.

18 Claims, 3 Drawing Sheets

REPRESENTATIVE
TAG SIGNAL (a)

SMALL INJECTED
SIGNAL (b)

SUM OF TAG    AC 0
& INJECTED   LEVEL
SIGNAL (c)

LIMITED SUM
SIGNAL (d)

SMALL TAG SIGNAL (a)

LARGE INJECTED SIGNAL (b)

SUM OF TAG & INJECTED SIGNAL (c)  AC 0 LEVEL

LIMITED SUM SIGNAL (d)

RANGE LIMITING SYSTEM

BACKGROUND AND FIELD OF THE INVENTION

This invention relates to a range limiting system which permits detection of desired backscatter-modulated signals but prevents detection of undesired backscatter-modulated signals and also effectively discriminates against system and radiated noise. More particularly, the system of the invention uses a deliberately injected signal which is combined both with desired and undesired signals to generate a combined signal from which desired backscatter-modulated signals can readily be detected. Systems of this type are described in U.S. Pat. No. 4,739,328 assigned to the same assignee as the subject invention.

The signals used in the invention to be detected come from small backscatterers, called "tags". These tags are located on moving or movable objects, such as vehicles, trains, or shipping containers. In the case of vehicles, for example, it is desirable to obtain specific information relating to the car or truck. The information is contained in the tag mounted on the vehicle, and is transmitted by backscatter modulation from the moving vehicle as it passes through a toll lane. However, other tagged vehicles also are passing through adjacent lanes or moving behind the desired vehicle in the same lane at the same time. If the backscattered signal-collecting antenna is aimed properly, there will be a small difference in signal strength between a desired and an undesired backscattered signal. However, in the presence of other noise, as well as system noise in the detection system itself, these small amplitude differences have been found to be hard to distinguish.

One technique used to improve the discrimination ability of the system is described in U.S. Patent Application Ser. No. 254,254 filed Oct. 6, 1988 and assigned to the same assignee as the subject invention. However, the technique of this invention is an alternative, and may indeed be employed together with the technique of the above-identified patent application to produce the most effective signal discrimination, particularly in areas of heavy signal traffic.

THE PRIOR ART

White noise has been used in the past to modulate the carrier frequency of transmitted radar signals. The return echo from the target is mixed with a portion of the transmitted signal. The mixer output is amplified in a bandpass amplifier. The coherent and incoherent portions of the amplified signal are then compared. If the coherent portion is greater by a predetermined amount than the incoherent portion, the target is known to have been detected by the radar. Such as system using white noise is described in U.S. Pat. No. 3,906,493. A similar system using colored noise is described in U.S. Pat. No. 3,668,702. Another radar thresholding technique which varies the threshold level up and down to eliminate noise and clutter is described in U.S. Pat. No. 3,701,149. This system stores sample pulse doppler echo returns in a filter bank. The samples are sequenced into a string of shift register networks and compared on the basis of their thresholds to an averaged threshold level which varies in accordance with the noise and clutter level. The frequency average of the noise and clutter is separated by varying the threshold sampling level up and down to eliminate the noise and clutter from the detected signal, which then protrudes above the threshold.

All of these prior art systems mix noise or other non-deterministic signals with the transmitted signal for purposes of signal discrimination. Noise and clutter are signals unintentionally present in the system. To the contrary, the range limiting system of the present invention purposely introduces a deterministic signal, having no desired information to be obtained, with the received signal to prevent the detection of a received signal from a tag that is of lower amplitude level than desired.

Noise which affects signal detection and reliability can come from many sources. In addtional to the external radiated noise picked up by the system antenna, whose type and amplitude are unpredictable, there also will be reader and amplifier noise, which is more predictable, but which may vary somewhat from one piece of equipment to another. Moreover, the amount of this system noise may also vary with ambient conditions such as temperature, making it unpredictable as well.

The amplitude of the desired returned signal also varies. For example, the amplitude may vary with the transmitted r.f. power, the distance between the reader antenna and the tag, the orientation of the tag vis-a-vis the antenna, the efficiency of the tag, as well as environmental factors such as fog, rain, snow and physical obstructions between the tag and the reader. It is not always possible to have geographic and environmental conditions sufficiently clear to discriminate between close tags without the improvement of this invention.

BRIEF DESCRIPTION OF THE INVENTION

Briefly, the range limiting system of the invention is capable of differentiating desired received signals having an amplitude above a predetermined threshold level and at least one other recognizable predetermined characteristic, from other received signals below that predetermined threshold amplitude. The system has a means for combining the received signal, which is of unknown amplitude which may be above or below the predetermined threshold amplitude, with a known signal of the predetermined threshold amplitude having at least one other predetermined characteristic which is distinguishable from the other recognizable characteristic of the received signal. The output of the combining means passes to a signal processing means which produces an output signal whose other recognizable characteristic is determined by the received signal only when the received signal is above the predetermined threshold amplitude, and by the known signal when the received signal is below the predetermined threshold amplitude. The presence or absence of the desired received signal is determined on the basis of analysis of the other predetermined characteristic of the output signal of the signal processing means.

The use of a known, deterministic signal, as described, has significant advantages over the prior art systems which introduce random signals, or "noise". Even though the return signal from the tag in the system of the invention is somewhat uncertain, the known signal against which the return signal is compared is no longer uncertain or variable. Contrary to noise signals, it is possible to make the known signal in this invention insufficiently larger than the natural noise floor of the system so that variations in the natural noise do not affect the system sensitivity of range. Moreover, the known signal used in this invention does not have the fuzzy or random properties of white or colored noise, allowing the setting of a sharp threshold and preventing the desired range setting to be unaffected by the statistical properties of random noise.

Still another advantage of the system of the invention is, because the known signal is not random, that the r.f. transmitted power level may be kept higher than if random noise were used as the threshold setting criterion. This ensures that the return signal level is comfortably above that of system, amplifier and environmental noise levels.

It is also important that the known signal have at least one property in addition to amplitude which makes it distinguishable from real returned, backscatter-modulated signals from a real tag. In a preferred embodiment, the known signal is a steady 40 kHz square wave signal which is injected into the system within the signal path between the tag and the reader. Alternatively, the known signal may be coupled to the reader itself. Such a steady 40 kHz signal can readily be distinguished from return tag signals which typically alternate between 40 kHz and 20 kHz.

One option for supplying the known signal is to use a special tag-like device, such as an extra tag, that interacts in space with the r.f. field of the tag to be detected. The known signal enters the system in the same way that the real return, backscatter-modulated signal from the tag does. The amplitude of the known signal can be set either by spatial placement of an additional tag, or by regulating the drive to the modulating element in the additional tag. If the known signal from this additional tag is of greater amplitude than other return tag signals, the system will not read any of the normal return tags. Thus, the known signal provides an effective mask against reading unwanted tags. Desired tags will have a signal amplitude in excess of the tag providing the known signal.

If the direct coupling method is employed, the known signal may be coupled using a coupling device placed in the r.f. coaxial cable connection between the r.f module and the antenna. The amplitude ma be controlled by using controllable attenuation in the coupling between the r.f. module-to-antenna r.f. cable and the modulating element. Alternatively, the 40kHz signal drive to the modulating element may be varied.

DESCRIPTION OF THE DRAWINGS

Referring to FIG. 1, an r.f. signal is transmitted by transmitter/receiver 10, through circulator 11 to antenna 12 to tag 13. The transmitted signal is backscatter-modulated by tag 13 using an alternating 20 kHz-to-40 kHz signal as the modulator. The desired information from the tag is contained in the shifts between 20 and 40 kHz. The return signal from tag 13 is received by antenna 12, fed through circulator 11 to mixer 14. The transmitted signal from transmitter/receiver 10, also fed to mixer 14, is used in the decoding process, as described is U.S. Patent Application Ser. No. 254,254, filed Oct. 6, 1988 and assigned to the same assignee as the subject invention. The return signal passes from mixer 14 through capacitor 16 and limiting amplifier 17 to decoder 18.

Figure 1:
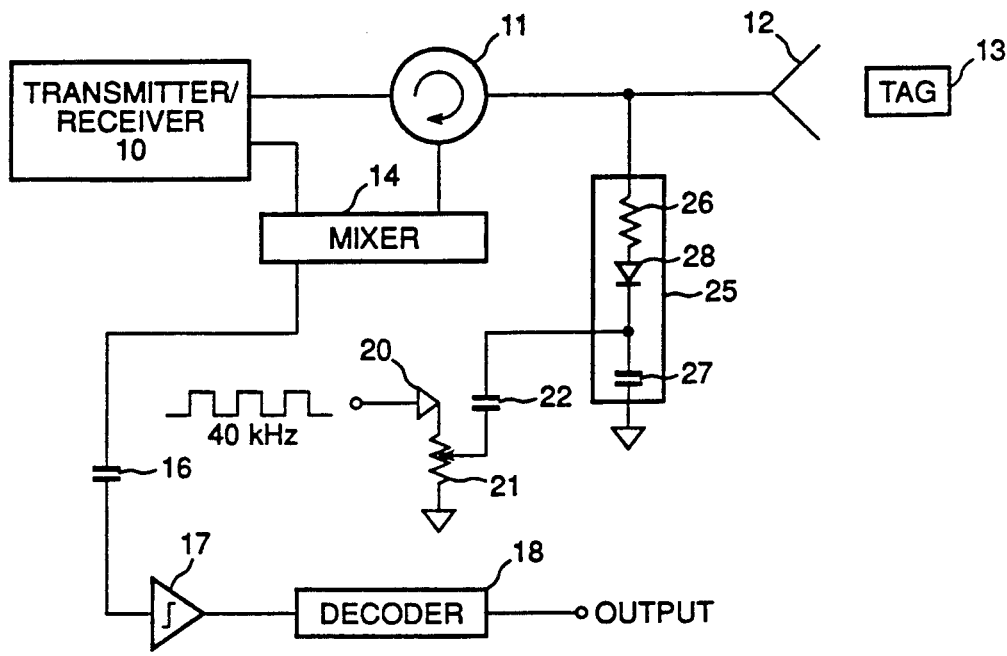
FIG. 1 is a schematic diagram of a preferred embodiment of the invention.

The known signal, for example, in the preferred embodiment, a 40 kHz square wave signal, is injected into amplfier 20 and is fed through variable attenuator 21 and capacitor 22, into a modulating circuit 25. Modulating circuit 25 is made up of resistor 26, which may for ing circuit 25 is made up of resistor 26, which may for example be 1K ohms, capacitor 27, which may, for example be 68 picofarads, and diode 28, which may, for example, be a No. 5082-2800 diode manufactured by the Hewlett Packard Corporation. Modulating circuit 25 causes a small change in the impedance between circulator 11 and antenna 12. The modulated output of modulating circuit 25 flows back through circulator 11 into mixer 14, and on to decoder 18, where its effect will be described below. A small part of its output signal power will also be transmittted through antenna 12. However, the level of this portion is sufficiently small to pass all regulatory requirements. The amplitude of the 40 kHz signal can be adjusted using variable attenuator 21, preferably a log taper potentiometer.

Figure 2:
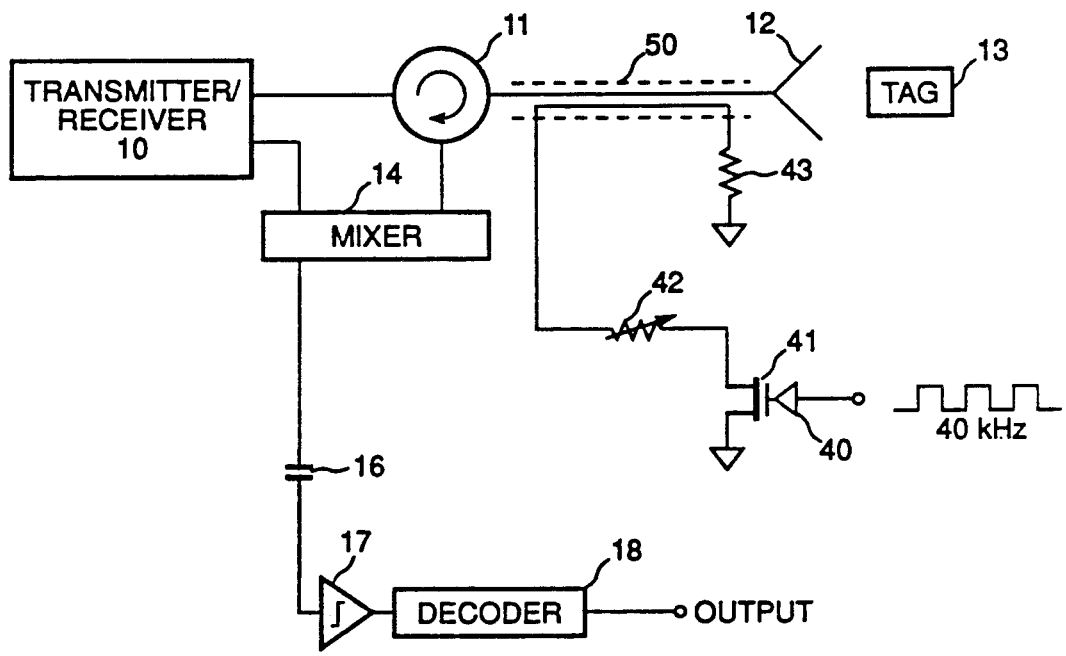
FIG. 2 is a schematic diagram of another preferred embodiment of the invention.

The circuit of FIG. 2 represents another preferred embodiment of the invention. Components corresponding to those shown in FIG. 1 bear the same reference numbers. In this embodiment, the 40 kHz known signal is injected into modulating FET device 41. The strength of the 40 kHz modulated r.f. signal is varied using variable attenuator 42. The output of attenuator 42 is coupled to the r.f. line between circulator 11 and antenna 12. The microstrip coupler 50, which may be used to couple these signals, must be well designed, preferably using coaxial construction, since the isolation between the transmitter/receiver 10 and the modulating FET 41 should be on the order of 20 to 100 dB, depending on the level of the injected 40 kHz signal. Modulation is provided by changing the r.f. impedance of the FET 41. In this embodiment as well, very little of the injected, known 40 kHz signal arrives at antenna 12 again well within Federal regulation. Resistor 43 is the normal back-termination resistance for coupler 50.

The operation of the range limiter of the invention may be best understood by reference to FIGS. 1 and 2 together with the graphs of FIGS. 3 and 4. A representative returned tag signal is shown in FIG. 3(a). This signal typically is a square wave having pulses either at 20 or 40 kHz. Using the apparatus of FIGS. 1 or 2, this tag return signal is combined with the injected, known 40 kHz signal shown in FIG. 3(b). In the preferred embodiment of this invention, the two signals are combined as modulated r.f. signals before r.f. detection. The detector or mixer output would have the appearance of the signals shown in FIGS. 3 and 4 if such signals were viewed on an oscilloscope. The combination of these signals as r.f signals before detection ensures that they are linearly combined. Alternatively one could combine the signals as "baseband" signals after detection and before amplification, but this is disadvantageous because, in the preferred embodiment of the system of this invention, there are three parallel channels of amplification and therefore three injection circuits would have to be used. Additionally, combination as modulated r.f. signals has the advantage of making the threshold setting substantially independent of variations in the transmitted r.f. level.

It should be obvious to one skilled in the art that the amplitude and polarity of the output of mixer 14 is dependent upon the relative r.f. phasing between the reference input to the mixer from transmitter/receiver 10 and the modulated backscatter signals both from tag 13 and from the injected known signal, whether it is derived as in the circuit of FIG. 1 or in the circuit of FIG. 2. Apparatus for working around this r.f. phasing problem have been described in U.S. Pat. Nos. 4,075,632 and 4,739,328, assigned to the same assignee as the subject invention, and it is apparent that the phasing problems between the returned tag signal and the known signal can be dealt with in the same way as described in these previous inventions.

The discussion which follows assumes that there is no relative phasing problem and that both the returned r.f. signal from the tag and the known signal are in the most favorable phase state so that the principles of the subject invention can be described without discussion of phasing. While there is a slight variation in threshold level setting depending on the relative r.f. phasing, and there is a preferred phase for the known injected signal, the effect is relatively minor and does not substantially detract from the usefulness of this method.

Figure 3A:
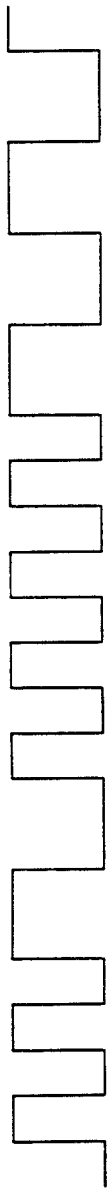
FIG. 3 (a)-(d) are a series of graphs showing the output during the receipt of a desired signal in the range limiting system of a preferred embodiment of the invention.
Figure 3B:
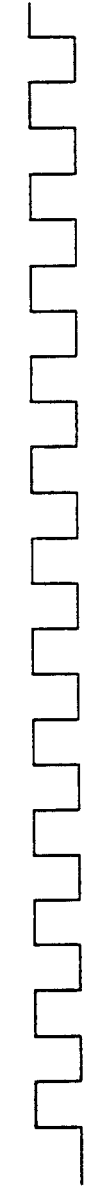
Figure 3C:
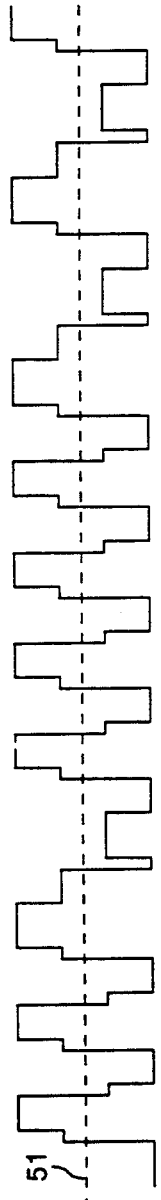
Figure 3D:
Figure 4A:
FIG. 4 (a)-(d) are a series of graphs showing the output in the absence of the receipt of a desired signal in the range limiting system of a preferred embodiment of the invention.
Figure 4B:
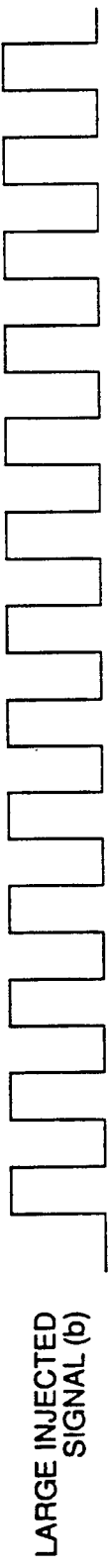
Figure 4C:
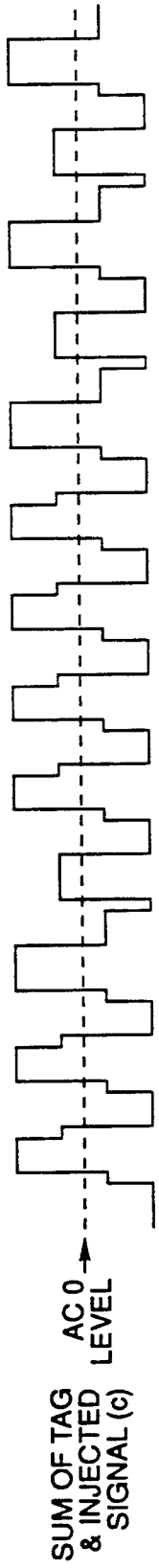
Figure 4D:
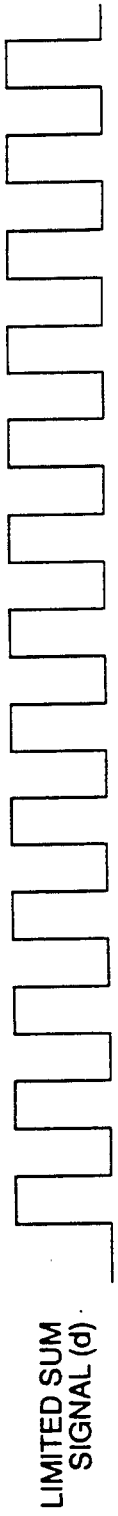

In this illustration of FIG. 3, the known signal of FIG. 3(b) is of smaller amplitude than the returned tag signal in FIG. 3(a). When they arrive at the output of mixer 14, these signals have been summed, and appear as shown in FIG. 3(c). The combined signals have the odd pulse shapes shown. They are then passed through limiting amplifier 17 which produces an output signal as shown in FIG. 3(d). Since the known 40 kHz signal is of lower amplitude than the returned tag signal in this illustration, limiting amplifier 17, which constructs pulses at the intersections of dotted line 51, representing the threshold amplitude limit of amplifier 17, produces an output signal which has the exact distinguishable characteristics of the original returned tag signal, as shown by comparing FIGS. 3(a) and 3(d). This amplitude-limited sum signal will provide the user with all the data encoded in the tag, which was backscatter modulated onto the return signal.

Where the return signal from the tag is of lower amplitude than the known 40 kHz injected signal, the results are shown in FIGS. 4(a)-(d). The small tag signal is shown in FIG. 4(a). The larger known injected 40 kHz signal is shown in FIG. 4(b). The combined signals from mixer 14 are shown in FIG. 4(c). After limiting, the signal from amplifier 17 is shown in FIG. 4(d). Note that the limiting amplifier always reconstructs the larger in amplitude of the combined signals. In this case, the larger is the injected 40 mHz known signal, which is reconstructed in FIG. 4(d). Since the known signal has a known characteristic in addition to its amplitude which is different from the tag signal, it can readily be identified. For example, using the apparatus described in U.S. Patent Application Ser. No. 149,609, filed Jan. 28, 1988, and assigned to the same assignee as this invention, the regular, single frequency nature of the injected signal may readily be distinguished from the tag signal which mixes 20 and 40 kHz frequency components. In this case, the range limiting circuit of this invention will prevent an undesired tag signal, whose amplitude is below the threshold desired, as set by the known signal threshold amplitude, from being read.

Although a 40 kHz square wave is preferred as the known signal, any signal which has a characteristic other than its amplitude which distinguishes it from a tag signal may be used. Square wave signals are compatible with the equipment described in the decoder of the above-referenced U.S. Patent Application.

Although the invention has been described with respect to its preferred embodiments, many modifications may be made without departing from the spirit and scope of the invention as set forth in the claims which follow.

We claim:

1. A range limiting system for differentiating between a first received signal having a recognizable characteristic which is an amplitude above a predetermined threshold level and at least one other recognizable predetermined characteristic, and a second received signal below said predetermined threshold amplitude, comprising:

means for combining a received signal of unknown amplitude, which may be a first received signal above said predetermined threshold amplitude or a second received signal below said predetermined threshold amplitude, with a known signal of said predetermined amplitude having at least one other predetermined characteristic which is distinguishable from said other recognizable predetermined characteristic of said first received signal; and signal processing means including amplitude comparison means for detecting relative signal amplitudes, having the combined signal as its input and which produces an output signal whose other recognizable characteristic is determined by said received signal only when said received signal is above said predetermined threshold amplitude, and by said known signal when said received signal is below said predetermined threshold amplitude, whereby the presence or absence of said first received signal may be determined on the basis of analysis of said other predetermined characteristic of said output signal of said signal processing means.

2. The range limiting system of claim 1 further characterized by said other predetermined characteristic of said first received signal being distinguishable from said other characteristic of said known signal on the basis of time-related features.

3. The range limiting system of claim 2 further characterized by said time-related features being frequency differences.

4. The range limiting system of claim 2 further characterized by said time-related features being phase differences.

5. The range limiting system of claim 1 further characterized by said signal processing means being a limiting amplifier.

6. The range limiting system of claim 1 further characterized by said signal processing means being a voltage comparator.

7. The range limiting system of claim 1 further characterized by said signal processing means being a limiting amplifier combined with a voltage comparator.

8. The range limiting system of claim 1 further characterized by said combining means being an r.f. coupler.

9. A range limiting system for differentiating between a first received signal having a recognizable characteristic which is an amplitude above a predetermined threshold level and at least one other recognizable predetermined characteristic, and a second received signal below said predetermined threshold amplitude, comprising:

means for supplying a known signal of said predetermined threshold amplitude having at least one other predetermined characteristic which is distinguishable from said other recognizable predetermined characteristic of said first received signal;

means for combining a received signal of unknown amplitude, which may be above or below said predetermined threshold amplitude, with said known signal;

signal processing means including amplitude comparison means for detecting relative signal amplitudes, having the combined signal as its input and which produces an output signal whose other recognizable characteristic is determined by said received signal only when said received signal is above said predetermined threshold amplitude, and by said known signal when said received signal is below said predetermined threshold amplitude, whereby the presence or absence of said first received signal may be determined on the basis of analysis of said other predetermined characteristic of said output signal of said signal processing means.

10. The range limiting system of claim 9 further characterized by said first received signal being supplied by a modulated backscatterer.

11. The range limiting system of claim 10 further characterized by said known signal being supplied by an additional modulated backscatterer.

12. The range limiting system of claim 10 further characterized by said second undesireable signals being supplied by an aditional modulated backscatterer of the same general type that supplies the desired received signals.

13. A range limiting system for differentiating between a first received signal having a recognizable characteristic which is an amplitude above a predetermined threshold level and at least one other recognizable predetermined characteristic, and a second received signal below said predetermined threshold amplitude, comprising:

means for combining a received signal of unknown amplitude, which may be a first received signal above said predetermined threshold amplitude or a second received signal below said predetermined threshold amplitude, with a known signal of said predetermined amplitude having at least one other predetermined characteristic which is distinguishable from said other recognizable predetermined characteristic of said first received signal;

signal processing means including amplitude threshold comparison means for detecting signal amplitudes, having the combined signal as its input and which produces an output signal whose other recognizable characteristic is determined by said received signal only when said received signal is above said predetermined threshold amplitude, and by said known signal when said received signal is below said predetermined threshold amplitude, whereby the presence or absence of said first received signal may be determined on the basis of analysis of said other predetermined characteristic of said output signal of said signal processing means; and means for determining the presence of a first received signal from the output of said signal processing means by distinguishing the between said first and said known signals on the basis of said other predetermined characteristic.

14. The range limiting system of claim 13 further characterized by said other predetermined characteristic of said first received signal being distinguishable from said other characteristic of said known signal on the basis of time-related features.

15. The range limiting system of claim 14 further characterized by said signal presence determining means being a frequency detection circuit.

16. A range limiting system for differentiating between a first received signal having a recognizable characteristic which is an amplitude above a predetermined threshold level and at least one other recognizable predetermined characteristic, and a second received signal below said predetermined threshold amplitude, comprising:

means for supplying a known signal whose amplitude is selected to be the threshold amplitude above which it is desired to receive signals, said known signal having at least one other recognizable predetermined characteristic which is distinguishable from said other recognizable predetermined characteristic of said first received signals;

means for combining a received signal of unknown amplitude, which may be above or below said predetermined threshold amplitude, with said known signal; and signal processing means including amplitude threshold comparison means for detecting relative signal amplitudes, having the combined signal as its input and which produces an output signal whose other recognizable characteristic is determined by said received signal only when said received signal is above said predetermined threshold amplitude, and by said known signal when said received signal is below said predetermined threshold amplitude, whereby the presence or absence of said first received signal may be determined on the basis of analysis of said other predetermined characteristic of said output signal of said signal processing means.

17. The range limiting system of claim 16 further characterized by means for supplying a known signal being a backscatter modulator whose predetermined threshold amplitude is determined by the extent to which it is coupled to said combining means.

18. The range limiting system of claim 16 further characterized by means for supplying a known signal being a backscatter modulator whose predetermined threshold amplitude is determined by the depth of modulation.

* * * * *